United States Patent [19]

Dimmick, III et al.

[11] Patent Number: 4,887,949
[45] Date of Patent: Dec. 19, 1989

[54] BOLT RETENTION APPARATUS

[75] Inventors: John H. Dimmick, III, Palm Beach County; Stephen W. Jorgensen, West Palm Beach, both of Fla.

[73] Assignee: United Technologies Corporation, Hartford, Conn.

[21] Appl. No.: 318,503

[22] Filed: Mar. 2, 1989

Related U.S. Application Data

[63] Continuation of Ser. No. 175,087, Mar. 30, 1988, abandoned.

[51] Int. Cl.$^4$ .............................................. F16B 39/10
[52] U.S. Cl. ..................... 411/121; 411/112; 411/131; 411/970; 403/22
[58] Field of Search .................... 411/84, 85, 111, 112, 411/119–125, 127, 131, 970; 24/135 K, 279, 297, 541, 543, 563; 403/21, 22, 316

[56] References Cited

U.S. PATENT DOCUMENTS

| 1,805,460 | 5/1931 | Carr | 411/112 |
| 2,303,148 | 11/1942 | Tinnerman | 411/111 |
| 2,495,037 | 1/1950 | Tinnerman | 411/112 |
| 2,727,552 | 12/1955 | Chvosta | 411/112 |
| 4,488,844 | 12/1984 | Baubles | 411/121 |
| 4,530,629 | 7/1985 | Sakow | 411/119 |

FOREIGN PATENT DOCUMENTS 2057617 4/1981 United Kingdom ............... 411/122

Primary Examiner—Gary L. Smith
Assistant Examiner—Douglas E. Ringel
Attorney, Agent, or Firm—Edward L. Kochey, Jr.

[57] ABSTRACT

A retention clip cooperates with a bolt and a flange through which the bolt passes to retain the bolt during blind assembly. Opening 28 in flange 26 receives bolt 24. Retention clip 40 is retained with extension 50 in recess 34 by engagement of the clip with the bolt. The clip in turn retains bolt 24 by engaging head 22 with arms 52. Surface 32 is adjacent to flat 60 resisting rotation of the bolt.

10 Claims, 3 Drawing Sheets

BOLT RETENTION APPARATUS

This is a continuation of application Ser. No. 07/175,087, filed Mar. 30, 1988, now abandoned.

DESCRIPTION

1. Technical Field

The invention relates to bolting and in particular to blind assembly bolting.

2. Background of the Invention

In an assembly of rotating equipment such as gas turbine engine fans there are occasions requiring blind assembly of bolts. In such situations the head of the bolt cannot be reached at the time that components to be joined are installed, when applying a nut, or when tightening a nut. Various clips and retaining means are known to retain a bolt at such time.

With high speed rotating equipment high stresses are formed and notches or scratches form stress concentrations. Any such stress concentration can cause failure during operation of the apparatus. It is therefore desirable that any such bolt retention means not require basic component design having substantial stress concentrations and that is avoid nicking or scratching the apparatus.

Lightweight is also important in such high speed rotating equipment and accordingly a lightweight simply constructed retention means is desirable.

SUMMARY OF THE INVENTION

A flange has a bolt receiving opening therethrough and there is a surface parallel to the axis of this bolt opening spaced from the opening. This surface has a recess facing toward the opening and includes a shoulder facing toward the flange. A retention clip at least partially surrounds the bolt shank and is held with an extension of the clip within the recess. The shank of the bolt limits movement of the clip transverse to the axis of the opening while the interference within the recess precludes movement in the direction along the axis of the bolt.

The same clip has a bolt head engaging means which resiliently receives and engages the head of a bolt. This prevents movement of the bolt axially with respect to the clip once it has been installed in position. The radial position of the clip is more precisely set by a portion of the extension bearing against a flat of the bolt head.

Accordingly, the clip is locked within the recess in one direction with the bolt precluding movement out of the recess while the clip in turn engages the head of the bolt to retain it in the other direction. Once the bolt is fully tightened, the bolt simply retains the clip in position with the clip fulfilling no function at that time.

DESCRIPTION OF THE PREFERRED EMBODIMENT

Figure 1:
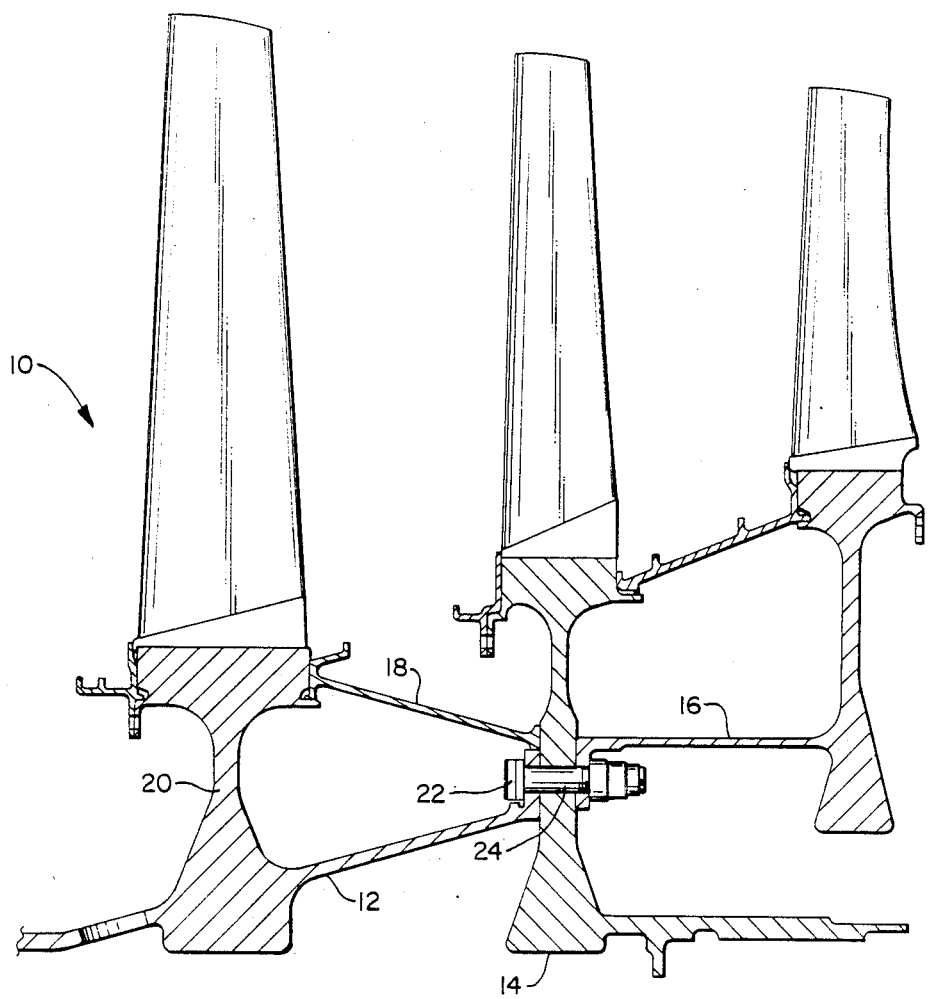
FIG. 1 is a partial sectional view of a gas turbine fan showing a tie bolt using the clip to retain the bolt in position.
Figure 2:
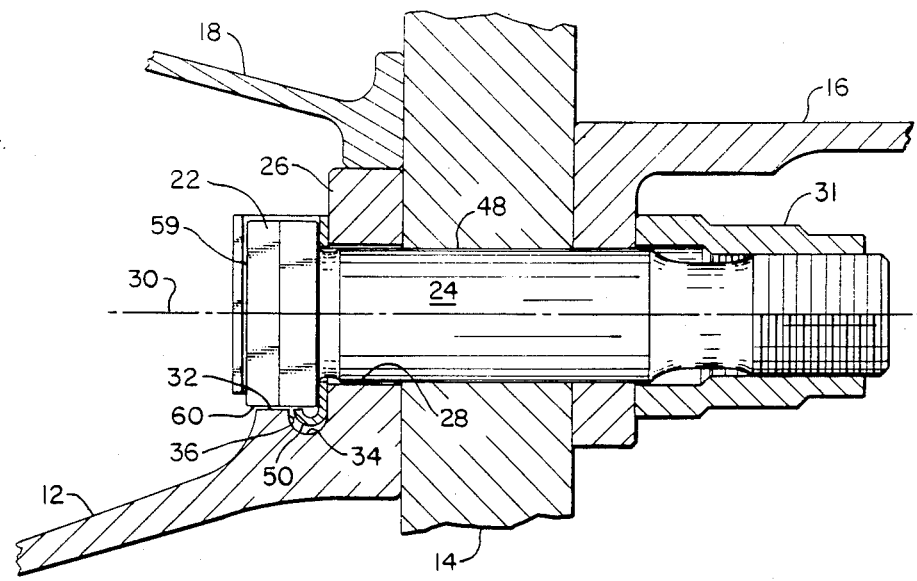
FIG. 2 is a detail of the area of the bolt.
Figure 3:
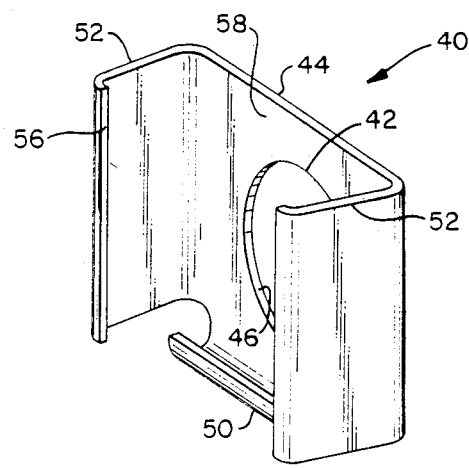
FIG. 3 is an isometric view of the clip.
Figure 4:
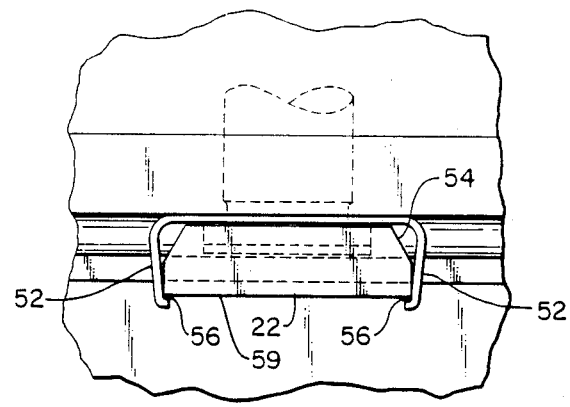
FIG. 4 is a plan view of the clip showing engagement of the bolt head.
Figure 5:
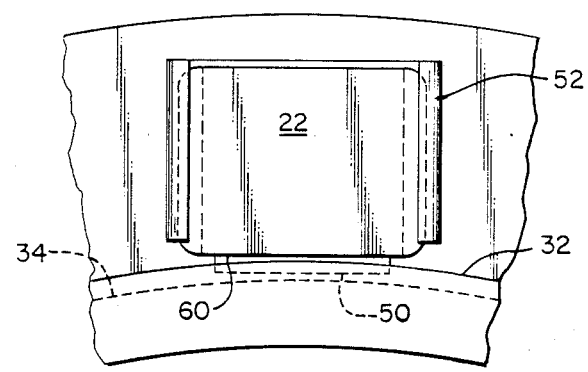
FIG. 5 is an elevation view showing the belt head engaged.

In the formation of a gas turbine engine fan rotor 10, a hub 12 is to be joined through a disk 14 to a hub 16. Prior to the final assembly thereof, a spacer 18 is located between disk 14 and disk 20. Accordingly, head 22 of bolt 24 is not accessible during the assembly.

Circumferential outwardly extending flange 26 is formed as a portion of hub 12. This flange has a plurality of belt receiving openings 28 therein in alignment with corresponding openings in fan disk 14.

Bolt 24, having an axis 30, passes through the opening and the bolt is adapted to receive nut 31 which ultimately secures the assembly together.

The hub 12 includes a surface 32 extending parallel to the axis 30 of the openings and facing toward the openings. Within this surface is a recess 34, preferably arcuate in cross section, including a shoulder 36 facing toward flange 26. Both surface 32 and recess 34 are smooth without sharp breaks and extend circumferentially around tub 12. No high stress producing geometry exists.

Retention clip 40 has a hole 42 in the base 44 of the clip. This hole has engagement surface 46 circumferentially surrounding the shank 48 of bolt 24. The base 44 extends by means of extension 50 into recess 34. This extension interacts with shoulder 36 and preferably is a continuation of base 44 curved to substantially conform to recess 34. Any force from shoulder 36 against extension 50 induces rotation around base 44, thus tending to increase locking in the recess. A portion of extension 50 abuts the head 22 of bolt 24, thereby more precisely locating and restraining clip 40. It can be seen that with the bolt in place, the clip 40 may not move outwardly from the recess and accordingly extension 50 cannot move outwardly from recess 34. Engagement of the clip and bolt also prevents movement of the clip circumferentially along the recess. Shoulder 36 operating against the extension prevents movement of the clip axially with respect to the bolt.

A pair of resilient arms 52 are secured to the base 44 of the clip and adapted to engage head 22 of the bolt. Such resilient engagement is facilitated by tapers 54 on the underside of the bolt head so that with the clip located in position the bolt may be forceably inserted into the hole springing the clip apart and retaining the bolt head on edges 56. Accordingly, the bolt shank retains the clip into a position wherein the shoulder of the recess restrains the clip and the clip in turn by arms 52 engages and holds bolt 24. Such clip is not damaged and is reusable after by springing opening arms 52 to release the bolt 54.

Ends 56 of arms 52 are bent over to be substantially parallel to surface 58 of the clip. The edge of each end is therefore substantially parallel with face 59 of the head of bolt 24. This provides the ability for the clip to restrain outward axial movement of the bolt without opening the arms. Only limited axial movement of the initially installed bolt is permitted. This is the sum of the clearance between shoulder 36 and extension 50 plus clearance between ends 56 and face 59 of the bolt head. Thus, the shank 48 extends as far as possible through opening 28 to act as a guide for the later assembled components.

It has been found that in the absence of physically opening the arms, the clip securely engages and retained the bolt 24 even in the presence of considerable forces which may be placed axially on the bolt during assembly. Any axial force placed on the bolt pulls through arms 52 against the base of the clip which forces extension 50 against retention surface 36 of the recess. Experiment has shown that the clip will shear apart before it will spring loose from engagement.

Bolt head 22 is installed with flat 60 having a small clearance from surface 32 in the installed position. This functions to resist rotation of the bolt during tightening of the nut. Clip 40 does not therefore experience tightening forces and may be of lightweight construction. The clip may be simply formed as punched and bent from a flat pattern.

In use, clip 40 is placed over opening 28 with extension 50 in recess 34. Bolt 24 with tapers 54 facing arms 52 is installed and pushed in by hand until the head 22 is locked by arms 52. This holds the bolt in position until nut 31 is later secured.

We claim:

1. An apparatus for retaining a single bolt in a bolt hole during blind assembly comprising:
   a flange having a bolt receiving opening, said opening having an axis;
   a surface parallel to said axis and spaced from said opening, said surface having a recess therein facing toward said opening and including a shoulder facing toward said flange;
   a bolt located within said opening, having a shank and a head;
   a retention clip including a base, said base located between said flange and the head of said bolt and at least partially surrounding the side of said shank facing said recess, and including an extension extending into said recess, a portion of said extension abutting an edge of the head of said bolt when said bolt is in said opening; and
   said retention clip also having resilient bolt head engaging arms secured to said base and engaging the face of said head for axially retaining said bolt.

2. An apparatus as in claim 1:
   said base completely circumferentially surrounding said shank.

3. An apparatus as in claim 2:
   said recess being arcuate in cross section; and
   said extension comprising a continuation of said base curved to substantially conform to said recess.

4. An apparatus as in claim 1:
   said recess being arcuate in cross section; and said extension comprising a continuation of said base curved to substantially conform to said recess.

5. An apparatus as in claim 4:
   said head of said bolt having a flat;
   said flat adjacent to said surface when said bolt is retained within said retention clip.

6. An apparatus as in claim 5;
   said resilient bolt head engaging arms having ends formed substantially parallel to and engaging the face of said head of said bolt, whereby axial loading of said arms by said bolt head will not tend to open said arms.

7. An apparatus as in claim 6:
   said base completely circumferentially surrounding said shank.

8. An apparatus as in claim 1:
   said head of said bolt having a flat;
   said flat adjacent to said surface when said bolt is retained within said retention clip.

9. An apparatus as in claim 8:
   said resilient bolt head engaging arms having ends formed substantially parallel to and engaging the face of said head of said bolt, whereby axial loading of said arms by said bolt head will not tend to open said arms.

10. An apparatus as in claim 1:
    said resilient bolt head engaging arms having ends formed substantially parallel to and engaging the face of said head of said bolt, whereby axial loading of said arms by said bolt head will not tend to open said arms.

* * * * *